Bean & Rowland,
Tanning App'r's.
No. 101,213. Patented Mar. 29, 1870.
Figure 1:—
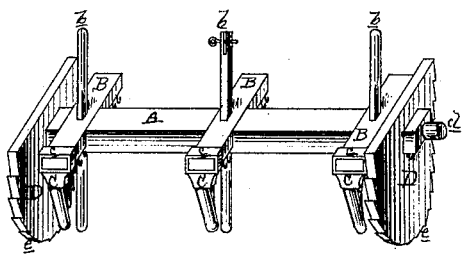
Figure 2—
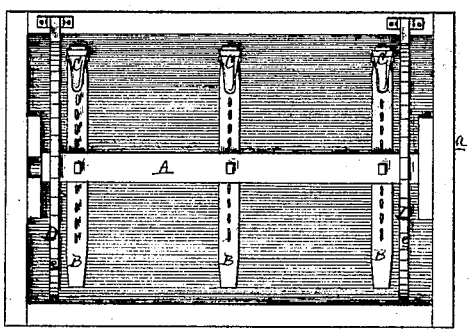
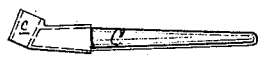
Figure 3—
ATTEST:
James Thierry
Barry S. Sprague
INVENTORS:
O. W. Bean
W. B. Rowland
per Attorney
Thos. S. Sprague

United States Patent Office.

OTIS W. BEAN AND W. B. ROWLAND, OF TECUMSEH, MICHIGAN.

Letters Patent No. 101,213, dated March 29, 1870.

IMPROVEMENT IN APPARATUS FOR TANNING LEATHER.

The Schedule referred to in these Letters Patent and making part of the same

*To whom it may concern:*

Be it known that we, OTIS W. BEAN and W. B. ROWLAND, of Tecumseh, in the county of Lenawee and State of Michigan, have invented a new and useful Improvement in Apparatus for Tanning Leather; and we do declare that the following is a true and accurate description thereof, reference being had to the accompanying drawings and to the letters of reference marked thereon, and being a part of this specification, in which—

Figure 1 is a perspective view of our apparatus detached from the vat which contains the tanning liquid, and in which our apparatus is designed to operate.

Figure 2 shows the apparatus attached to a vat, and in operation.

Figure 3 is a detached view of the guard-arms.

Like letters indicate like parts in each figure.

The nature of this invention relates to an improvement in apparatus to be employed in tanning, and consists in attaching guard-arms to the ends of the transverse arms of a frame, which is suspended to the top of a vat containing the tanning liquid, upon its center, in such a manner that after the hides, which are suspended from suitable hooks attached to the transverse arms of said frame, have been immersed and agitated in the tanning-liquid, they may be aired by reversing the position of the frame, when the hides will rest against the guard-arms.

It further consists in placing upon the central longitudinal bar of said frame, (which bar is journaled at each end to fit proper boxes in the ends of the vats, upon which journals the frame rotates,) and at each end thereof semi-circular ratchet-wheels, the ratchets upon which engage with a suitable pawl secured to the vat, and hold the frame with its hides in any desired position.

In the accompanying drawings—

A represents a bar, which should be of the length of the interior of the vat $a$, and to which are secured the transverse arms B, to the under side of which are fastened a series of metallic hooks, to which to suspend the hides. These transverse arms should be somewhat shorter than the width of the vat, and so secured to the bar A that said bar is the center of the frame and the axis upon which it rotates.

The hides are secured to the hooks upon the under side of the arms B, the frame being in place over the vat, and immersed in the tanning-liquid with which the vat is filled.

As the liquid has a tendency to settle and become heavier at the bottom of the vat, it may be agitated by rocking the frame, by means of the handles $b$, to which pitmen may be secured, if necessary.

In the process of tanning, after the hides have been immersed in the liquid for some hours, it is deemed advisable that they should be exposed to the air for a short time, and then be re-immersed.

When such airing is to be had, the guard-arms C, which are made substantially as shown, are secured to the ends of the transverse arms B, by means of the socket $c$ or any other suitable device. These guard-arms, as the frame is rotated so that the hides are taken out of the vat, will prevent said hides from doubling down, and hold them in position.

As hides vary in length, to prevent their chafing against the ends of the vat, in the operation described above, there are secured to each end of the bar A, just within the journals $d$, the semi-circular plates D, the circular edges of which are provided with ratchet-teeth $e$, which are designed to engage with a suitable pawl which may be secured to the sides of the vat, so that when the frame is reversed, for the purpose of exposing the hides to the air, said pawl, in its engagement with the teeth $e$, will hold the frame in the desired position, and the plates D will protect the ends of the hides from chafing against the ends of the vat. This apparatus will be found equally serviceable in lining and baiting the hides as in tanning.

We expressly disclaim any part of the invention of Stephen J. Patterson, for which he obtained Letters Patent on the 8th day of October, 1861; but

What we claim as our invention, and desire to secure by Letters Patent, is—

1. In apparatus for tanning purposes, the guard-arms C, when employed in connection with the transverse arms B, for the purposes herein described.

2. In apparatus for tanning purposes, the semi-circular plates D, provided with ratchet-teeth $e$, in connection with the bar A, and for the purposes herein set forth.

3. The arrangement of the frame composed of the bar A and transverse arms B, with the guard-arms C and semi-circular plates D, when constructed, combined, and operating substantially as and for the purposes herein specified.

OTIS W. BEAN.
W. B. ROWLAND.

Witnesses:
H. S. SPRAGUE,
H. F. EBERTS.